US012393488B2

(12) United States Patent
George et al.

(10) Patent No.: US 12,393,488 B2
(45) Date of Patent: Aug. 19, 2025

(54) PHYSICAL SIZE API FOR SNAPSHOTS BACKED UP TO OBJECT STORE

(71) Applicant: NetApp Inc., San Jose, CA (US)

(72) Inventors: Tijin George, Sunnyvale, CA (US); Sharankumar Yelheri, Santa Clara, CA (US); Adhitya Rajagopalan, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 463 days.

(21) Appl. No.: 17/731,545

(22) Filed: Apr. 28, 2022

(65) Prior Publication Data

US 2023/0350760 A1 Nov. 2, 2023

(51) Int. Cl.
G06F 11/14 (2006.01)
G06F 9/54 (2006.01)
G06F 16/11 (2019.01)

(52) U.S. Cl.
CPC .......... *G06F 11/1451* (2013.01); *G06F 9/544* (2013.01); *G06F 16/128* (2019.01); *G06F 2201/84* (2013.01)

(58) Field of Classification Search
CPC ... G06F 11/14; G06F 11/1451; G06F 2201/84
See application file for complete search history.

(56) References Cited

U.S. PATENT DOCUMENTS

| 7,900,006 | B2 * | 3/2011 | Nagaraj | G06F 11/1464 |
| | | | | 711/162 |
| 8,904,231 | B2 * | 12/2014 | Coatney | G06F 11/2023 |
| | | | | 714/4.11 |
| 11,669,365 | B1 * | 6/2023 | Aithal | G06F 9/5027 |
| | | | | 718/102 |
| 2004/0002934 | A1 * | 1/2004 | Taulbee | G06F 16/10 |
| 2008/0185432 | A1 * | 8/2008 | Caballero | G06F 11/3093 |
| | | | | 235/435 |
| 2014/0344222 | A1 * | 11/2014 | Morris | G06F 16/1844 |
| | | | | 707/634 |
| 2015/0310126 | A1 * | 10/2015 | Steiner | G06F 16/9574 |
| | | | | 715/204 |
| 2016/0092313 | A1 * | 3/2016 | Kruglick | H04L 9/3271 |
| | | | | 707/649 |
| 2017/0063986 | A1 * | 3/2017 | Gopal | H04L 67/1095 |
| 2018/0121453 | A1 * | 5/2018 | Jain | G06F 11/1464 |
| 2018/0121454 | A1 * | 5/2018 | Kushwah | G06F 12/121 |
| 2020/0285612 | A1 * | 9/2020 | George | G06F 16/907 |
| 2022/0222378 | A1 * | 7/2022 | Johannsen | H04L 67/56 |

(Continued)

*Primary Examiner* — Kamini B Patel
(74) *Attorney, Agent, or Firm* — Cooper Legal Group, LLC

(57) ABSTRACT

Techniques are provided for determining a physical size of a snapshot backed up to an object store. Snapshot data of the snapshot may be backed up into objects that are stored from a node to the object store, such as a cloud computing environment. A tracking object is created to identify which objects within the object store comprise the snapshot data of the snapshot. In order to determine the physical size of the snapshot, the tracking object and/or tracking objects of other snapshots such as a prior snapshot are evaluated to identify a set of objects comprising snapshot data unique to the snapshot and not shared with the prior snapshot. The physical sizes of the set of objects are combined with a metadata size of metadata of the snapshot to determine the physical size of the snapshot.

20 Claims, 12 Drawing Sheets

(56) References Cited

U.S. PATENT DOCUMENTS

| | | | |
|---|---|---|---|
| 2023/0029677 A1* | 2/2023 | Gupta | G06F 16/128 |
| 2023/0133533 A1* | 5/2023 | George | G06F 11/1464 |
| | | | 707/646 |
| 2023/0135954 A1* | 5/2023 | Sharma | G06F 3/064 |
| 2023/0315418 A1* | 10/2023 | Bokhan-Dilawari | G06F 8/61 |
| 2023/0315428 A1* | 10/2023 | Hendrey | G06F 8/65 |
| 2023/0319054 A1* | 10/2023 | Hendrey | H04L 63/105 |
| | | | 726/4 |
| 2023/0385153 A1* | 11/2023 | George | G06F 11/1435 |

* cited by examiner

PHYSICAL SIZE API FOR SNAPSHOTS BACKED UP TO OBJECT STORE

BACKGROUND

A device such as a node may store data within a volume on behalf of a client. The volume may be stored within storage managed by the node, such as within on-prem storage. The node may implement storage management functions for the client. For example, the node may create backups of the volume by creating snapshots of the volume. A snapshot of the volume may capture a point-in-time representation of a state of the volume. The device may use the snapshot in order to restore the volume back to the state of the volume captured by the snapshot. Over time, a large number of snapshots may be created, which can consume a significant amount of storage. In order to more efficiently and cost effectively store these snapshots, the snapshots may be backed up to an object store that provides low cost and long term scalable storage compared to the storage managed by the node.

DESCRIPTION OF THE DRAWINGS

FIG. 9 is a block diagram illustrating an exemplary node computing device.

DETAILED DESCRIPTION

Figure 1:
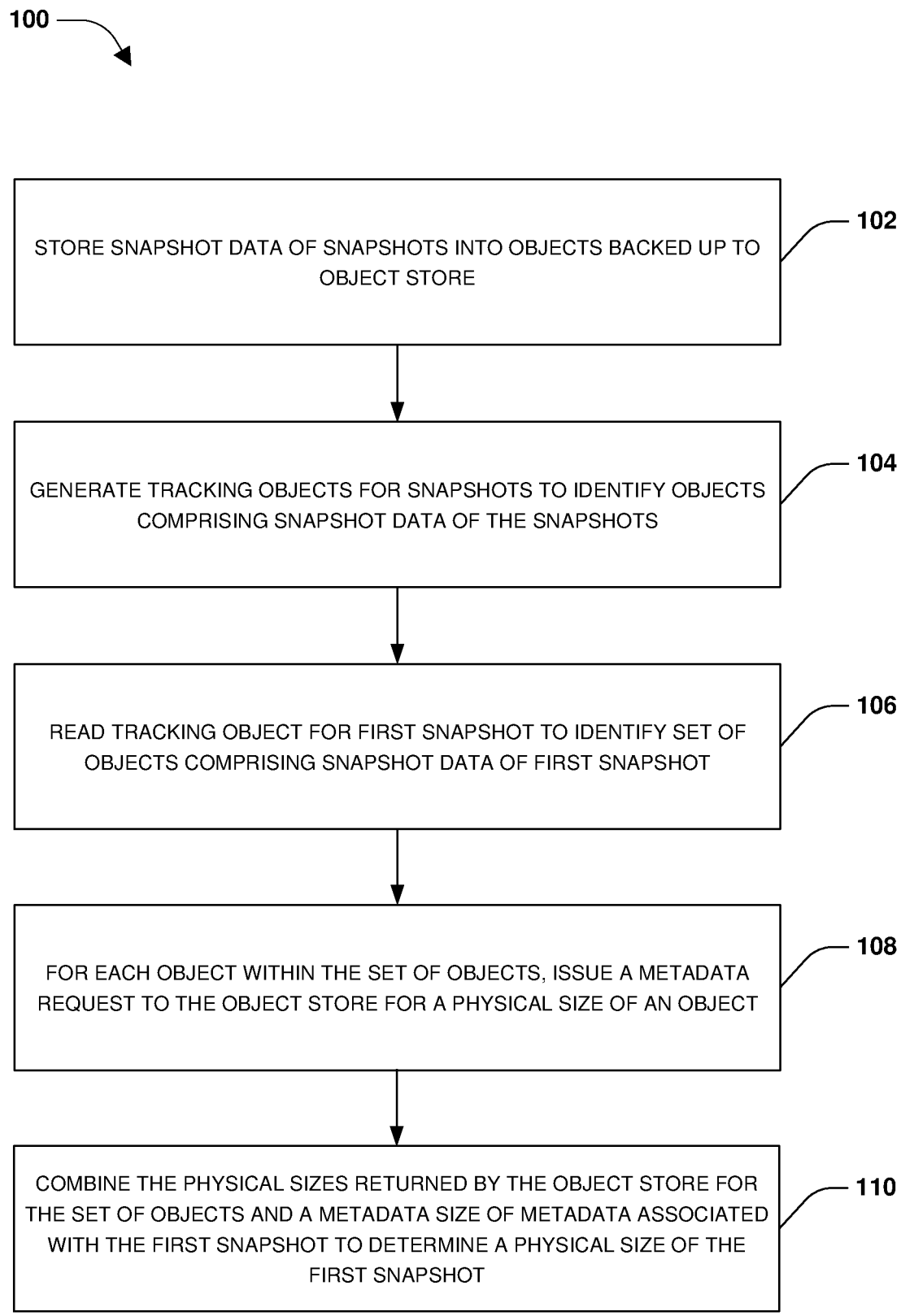
FIG. 1 is a flow chart illustrating an example method for determining a physical size of a snapshot backed up to an object store in accordance with various embodiments of the present technology.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A backup service may be used to back up snapshots of primary volumes to an object store. This backup service has certain requirements that are to be met in order for proper operation. The backup service must be able to accurately determine the physical size consumed by a snapshot in the object store. Accurately determining the physical size used by a snapshot whose snapshot data is stored across multiple objects in the object store is not straightforward for multiple reasons. In particular, the backup service may implement a mesh file system where snapshots may have snapshot data stored across multiple objects in the object store, and an object may store snapshot data of multiple snapshots (e.g., multiple snapshots may reference/share the same object due to the incremental nature of snapshots). This makes identifying objects that uniquely comprise snapshot data of a particular snapshot in order to calculate a size of the snapshot based upon the sizes of these objects difficult. Accurately determining the physical size used by a snapshot is also difficult due to additional compression provided for objects in the object store.

Furthermore, identifying the physical size of a snapshot is difficult because snapshots may be incremental, and thus a prior snapshot and a next snapshot can change over time as snapshots are created and deleted. For example, a user may want to know the physical snapshot size across incremental snapshots, such as the physical size of a snapshot (S4) in relation to a prior snapshot (S3). Over time, the prior snapshot (S3) may be deleted, and thus the prior snapshot is now snapshot (S2), which can change the physical size of snapshot (S4) because the snapshot data unique to snapshot (S4) may be larger in relation to prior snapshot (S2) than in relation to prior snapshot (S3).

Previously, determining the size of snapshots stored on-prem as opposed to an object store did not have these issues because snapshot data of a snapshot was not stored across multiple objects and an object did not comprise snapshot data that could be shared by multiple snapshots. It was trivial to identify the logical size or primary volume size of storage consumed by a customer when such data was stored on-prem.

Accordingly, as provided herein, a physical size API is configured for determining the actual physical size of snapshots, such as the physical size consumed by a single snapshot (a physical size of an incremental snapshot compared to a prior snapshot), a total/cumulative physical size of a snapshot that takes into account unique and shared snapshot data referenced by the snapshot, etc. The physical size API may be an application programming interface that accepts API calls (e.g., representation state transfer (REST) API calls) from requestors (e.g., client applications, storage services, etc.). Based upon the API calls, such as an API call requesting the physical size of a particular snapshot, the physical size API executes instructions to process the API call such as to determine the physical size of the snapshot. The physical size API then provides a response back to the requestor with the physical size of the snapshot. The physical size API may be implemented as program code that can be executed by a server, a computing device, a serverless thread, a container, etc.

When the backup service is to back up a snapshot from a primary volume (on-prem) to the object store, snapshot data of the snapshot is stored within objects of 4 MB. Because snapshots are stored in an incremental manner to the object store, only the snapshot data of the snapshot that has not already been stored into the object store is stored backed up to the object store within new objects. Once the new objects comprising the snapshot data unique to the snapshot have been created, then the new objects are stored into the object store and a tracking object (a GC object) is created for the snapshot. In some embodiments, the tracking object is a bitmap that indicates which objects in the object store comprise snapshot data of the snapshot. Each object is identified by a sequence number, which are used as indexes in the tracking object. If an object comprises snapshot data of a snapshot, then a sequence number of the object in the tracking object will be set to 1, otherwise 0. Each snapshot has its own tracking object used to indicate which objects comprise snapshot data of the snapshots.

The physical size API uses the tracking objects of snapshots in order to identify the physical size of snapshots that are stored in objects within the object store. In some embodiments of determining the physical size used by a single snapshot when there is only 1 snapshot transferred to the object store, the physical size API reads the tracking object of the snapshot in order to identify the objects comprising snapshot data of the snapshot. For each object, a metadata request is issued to the object store in order to identify a size of a corresponding object comprising snapshot data of the snapshot. The sizes returned in responses to the metadata request are added together to get a total physical size consumed by the objects comprising the snapshot data of the snapshot. The snapshot may have metadata associated with the snapshot, and the size of the metadata (which is a known size) is added to the total physical size consumed by the objects, which provides the physical size of the snapshot.

In some embodiments of determining the physical size of a snapshot in relation to a prior snapshot where the snapshot is a next incremental snapshot created subsequent the prior snapshot, a client may request the physical size of the snapshot, such as snapshot (S3). The backup service does incremental updates of snapshots to the object store, as opposed to recopying all snapshot data of a snapshot that could overlap with snapshot data of prior snapshots. When snapshot (S3) is backed up to the object store, the backup service only creates new objects to comprise snapshot data unique to snapshot (S3), and thus this unique snapshot data has not already been backed up to the object store. For example, the new objects will not comprise snapshot data of prior snapshot (S2), prior snapshot (S1), and/or other snapshot data of snapshot (S3) shared with other prior snapshots already backed up to the object store. The prior snapshot (S1) may be a first snapshot that is created at a first point in time, and is thus referred so as prior snapshot (S1). The prior snapshot (S2) may be a second snapshot that is created at a second point in time after the prior snapshot (S1), and is thus referred so as prior snapshot (S2). The snapshot (S3) may be a third snapshot that is created at a third point in time after the second point in time, and is thus referred so as snapshot (S3).

As part of identifying the physical size of snapshot (S3), the physical size API identifies the prior snapshot in relation to snapshot (S3), which may be snapshot (S2). In order to obtain the physical size of snapshot (S3), only those objects comprising unique snapshot data of snapshot (S3) are taken into account. In order to identify these objects, the tracking object of snapshot (S3) is evaluated to identify objects storing snapshot data referenced by the snapshot (S3). The tracking object of snapshot (S2) is evaluated to identify the objects storing snapshot data referenced by the snapshot (S2). These objects are compared in order to identify only those objects comprising unique snapshot data of snapshot (S3) and not comprising snapshot data of (S2), which corresponds to objects identified within the tracking object of snapshot (S3) and not identified within the tracking object of snapshot (S2). Similar to the prior scenario where only a single snapshot was backed up to the object store, metadata requests are issued to the object store in order to identify the sizes of the unique objects comprising snapshot data unique to the snapshot (S3) and not shared snapshot data that is shared with the prior snapshot (S2). The sizes returned in responses to the metadata requests are added together to get a total physical size consumed by the objects comprising the snapshot data unique to snapshot (S3). The snapshot (S3) may have metadata associated with the snapshot (S3), and the size of the metadata (which is a known size) is added to the total physical size consumed by the objects, which provides the physical size of the snapshot (S3).

In some embodiments, instances of the physical size API may be implemented through serverless containers that are purely serverless and stateless. The instances of the physical size API are run as serverless containers. For example, these serverless containers are run in a cloud computing environment. Because these serverless containers are stateless, a serverless container running a physical size API of this innovation can be stopped, deleted, restarted, and/or have its processing transferred to or restarted through a different serverless container such as due to a crash. Because the physical size API is implemented through serverless containers, there is no need to maintain state within code of the physical size APIs. In order to make the physical size API Cloud friendly, progress tracking, health tracking, and checkpoints are implemented through tracking structures (cookies) and object tags (tags) so that if there is a crash during execution of a physical size API, then the processing that was performed by the physical size API may be resumed from a checkpoint so that the processing does not have to be restarted from the beginning. This is made possible through the use of tracking structures (cookies) and object tags (tags). Also, the serverless containers are only run when there is processing to be performed, which reduces the costs of hosting the physical size APIs.

In some embodiments of implementing tags, when the physical size of a snapshot is determined, the physical size is stored within an object tag. The object tag is stored within a Root Object of the snapshot. The Root Object is metadata that is maintained within the object store. Thus, even though a serverless container may be used by this innovation to determine the physical size, the serverless container or any other serverless container may read and return the physical size stored in the object tag of the Root Object in the object store without having to locally maintain this information within memory. Persistent the object store into the Root Object in the object store solves issues where this information cannot be adequately tracked in memory because the location of where serverless containers is not known ahead of time. Instead these object tags are stored in the object store, which allows any serverless container to access the previously identified physical size of a snapshot without having to recalculate such in the event the physical size is subsequently requested.

In some embodiments of implementing tracking structures (cookies), the tracking structures are used because there may not be the ability to reliably store state information (checkpoints corresponding to a context of prior execution for determining the physical size of a snapshot) and already calculated physical size data within local memory/storage used by the serverless containers because the location of the serverless containers is not known ahead of time. Accordingly, cookies are used to track checkpoints of processing (a context of prior execution for determining the physical size of a snapshot) so that the checkpoints within the cookies may be used to resume the processing from the checkpoints in the event of a crash or other issue so that the processing does not need to be restarted from the beginning. For example, when a caller (user) issues a request for a physical size of a snapshot, a background process is triggered to calculate the physical sizes of the objects comprising the snapshot data of the snapshot. The caller is returned a cookie (e.g., a 307 cookie) that acts as a checkpoint mechanism for restarting the processing in the event a serverless container hosting the background process crashes or needs to restart. In this way, the context of the prior processing (e.g., the physical sizes of objects that have already been calculated) tracked in the cookie is used to resume processing from the checkpoint as opposed to resuming processing from the beginning.

Figure 2:
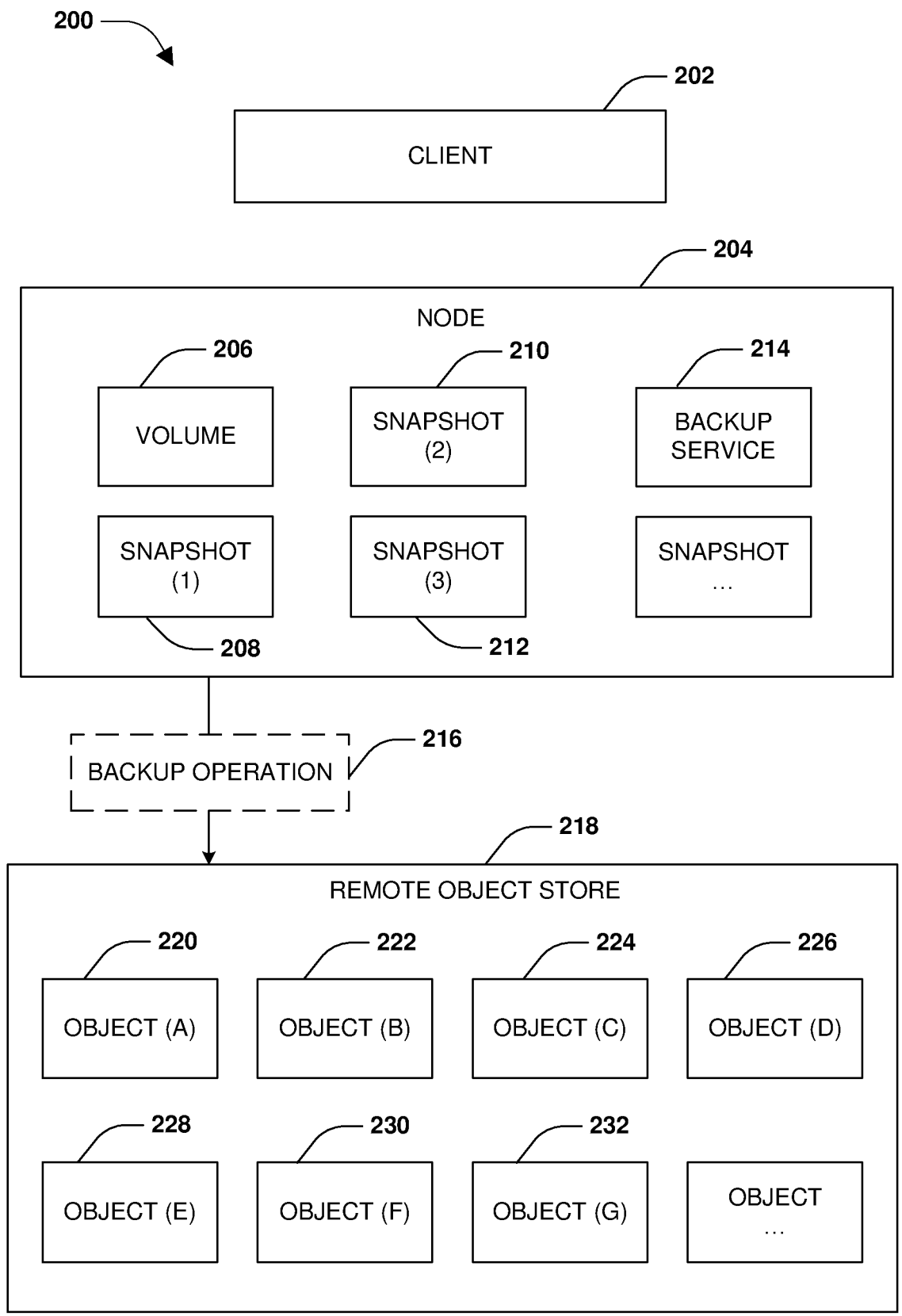
FIG. 2 is a block diagram illustrating an example system for backing up snapshots to an object store in accordance with various embodiments of the present technology.

One embodiment of determining a physical size of a snapshot backed up to an object store is illustrated by an exemplary method 100 of FIG. 1, which is further described in conjunction with the systems of FIGS. 2-5, 6A, and 6B. A node 204 may host a volume 206 accessible to a client 202, as illustrated by FIG. 2. The node 204 may implement a backup service 214 configured to provide backup and/or restore functionality for the volume 206. The backup service 214 may be configured to generate snapshots of the volume 206, such as a first snapshot 208, a second snapshot 210, a third snapshot 212, and/or other snapshots. During operation 102 of method 100, the backup service 214 may implement a backup operation 216 to back up the snapshots to an object store 218 (e.g., a cloud storage environments), which may be remote to the node 204. In particular, snapshot data of a snapshot may be stored into slots of objects that are formatted according to an object format. The objects, such as an object (A) 220, an object (B) 222, an object (C) 224, an object (D) 226, an object (E) 228, an object (F) 230, and an object (G) 232, are then stored by the backup service 214 into the object store 218 by the backup operation 216. A root object and/or other metadata of a snapshot may be stored within the object store 218, such within root objects 322.

In some embodiments, the object store 218 is a storage environment hosted by a 3$^{rd}$ party cloud storage provider. The storage environment may comprise storage buckets within which objects may be stored. The storage environment may be comprised of storage devices hosted and maintained by the 3$^{rd}$ party cloud storage provider. The storage environment may be accessible to client devices, such as the node 204, over a network. The storage environment may have a frontend with which the client devices interact. The frontend may receive API requests transmitted by the client devices to the storage environment. The API requests may correspond to various processing and functionality that the client devices are requesting from the storage environment to perform, such as storing objects within the storage environment. In this way, the 3$^{rd}$ party cloud storage provider provides clients with storage through storage buckets of the storage environment as the object store 218 accessible through API requests transmitted over a network from client devices to the frontend of the storage environment. The 3$^{rd}$ party cloud storage provider may also provide compute, such as processor and memory resource, which may be assigned to clients for use in hosting applications, websites, and services within virtual machines, containers, etc.

As snapshots are created over time, the backup service 214 may incrementally backup the snapshots in an incremental manner so that redundant snapshot data is not redundantly stored within the object store 218. As part of incrementally backing up a snapshot, new objects are created to store unique snapshot data of the snapshot that is not shared with other snapshots already backed up to the object store 218. New objects are not created to store snapshot data of the snapshot that is shared with other snapshots already backed up to the object store 218. In this way, only the unique snapshot data of the snapshot not shared other snapshots already backed up to the object store 218 is backed up to the object store 218 as the new objects.

Figure 7A:
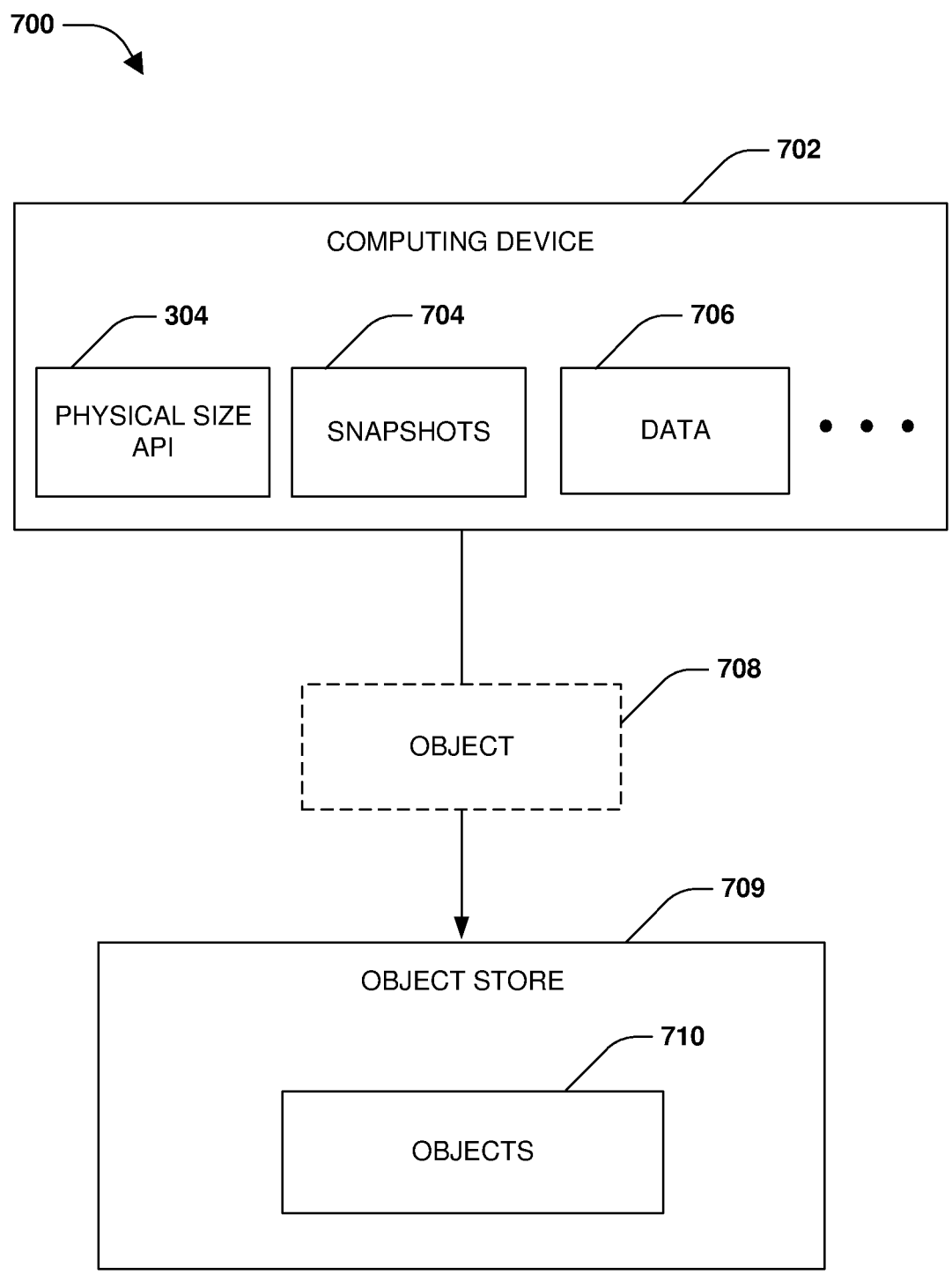
FIG. 7A is a component block diagram illustrating an example system for managing objects within an object store using an object file system.

It may be appreciated that further details regarding backing up snapshot data as objects that are formatted according to the object format will be subsequently described in relation to FIGS. 7A-7C.

Figure 3:
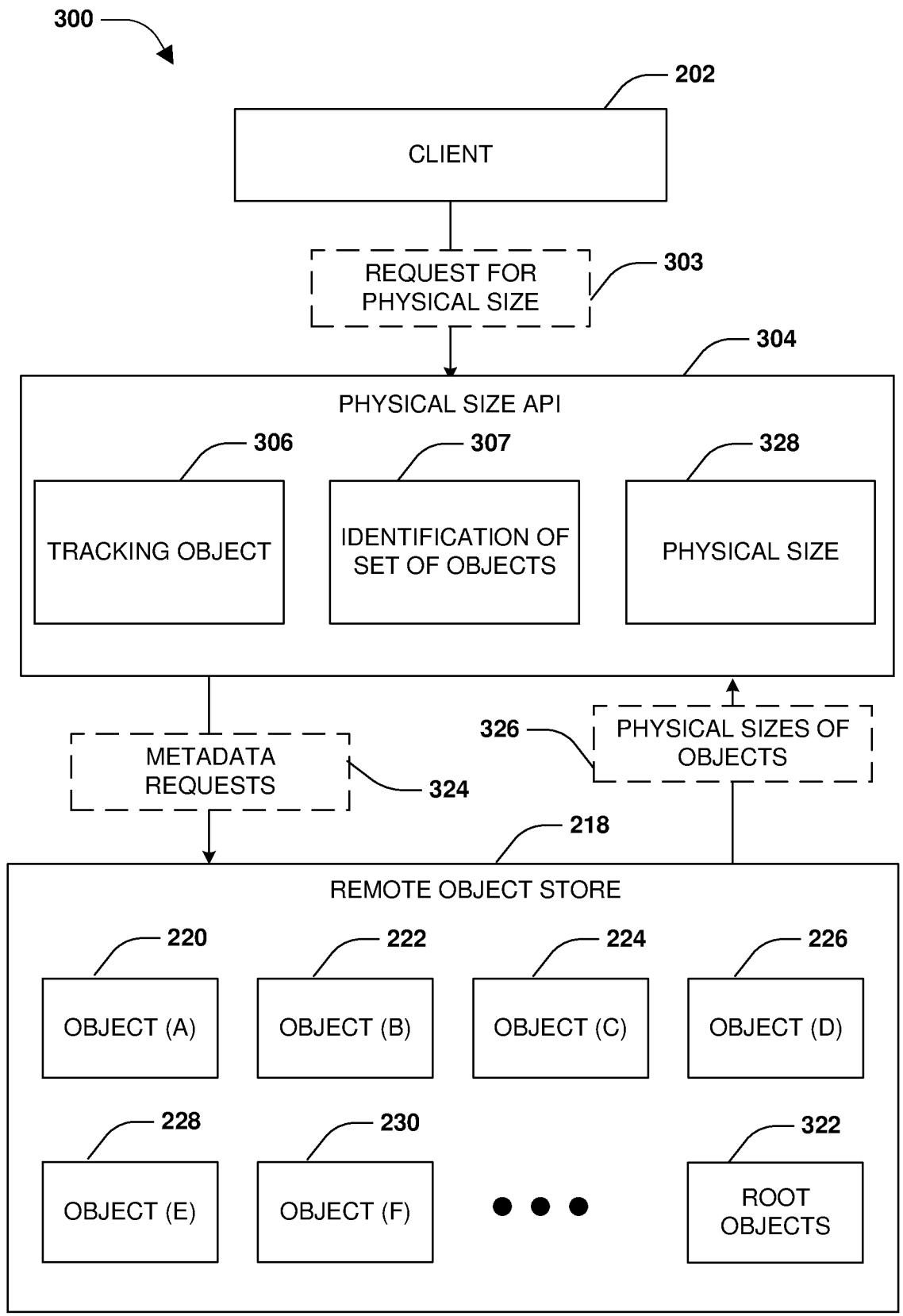
FIG. 3 is a block diagram illustrating an example system for determining a physical size of a snapshot backed up to an object store in accordance with various embodiments of the present technology.

FIG. 3 illustrates a physical size API 304 that is configured to determine a physical size of snapshots backed up to the object store 218 within objects according to the object format. In some embodiments, the physical size API 304 may be hosted within an active data connector (ADC) that is implemented as a container (e.g., a container within a Kubernetes environment). In some embodiments, the physical size API 304 may be hosted as a serverless container within a cloud computing environment. The physical size API 304 may have access to tracking objects that were created with snapshots were backed up to the object store 218. In particular, when the backup service 214 backed up the first snapshot 208 to the object store 218, a tracking object 306 may have been created, during operation 104 of method 100. The tracking object 306 may identify which objects in the object store 218 store snapshot data of the first snapshot 208. In some embodiments, the tracking object 306 may be created as a bitmap comprising sequence numbers assigned to objects in the object store 218. In some embodiments, the bitmap may be indexed by the sequence numbers assigned to the objects. A sequence number for the object (A) 220 may be set to either a first value to indicate that the object (A) comprises snapshot data of the snapshot or a second value to indicate that the object (A) does not comprise snapshot data of the snapshot. In this way, the tracking object 306 can be evaluated by the physical size API 304 to identify which objects comprise snapshot data of the snapshot.

The physical size API 304 may receive a request 303 from the client 202 for a physical size 328 of the first snapshot 208. In some embodiments, the physical size API 304 may determine that the first snapshot 208 is the only snapshot of the volume 206 that has been backed up to the object store 218 when the request 303 was received. Accordingly, during operation 106 of method 100, the physical size API 304 may read the tracking object 306 for the first snapshot 208 to identify which objects comprise snapshot data of the first snapshot 208. For example, sequence numbers that are set to the first value within the tracking object 306 may indicate that corresponding objects having those sequence numbers comprise the snapshot data of the first snapshot 208. In this way, a set of objects 307 comprising snapshot data of the first snapshot 208 are identified.

During operation 108 of method 100, metadata requests 324 may be issued to the object store 218 for each object within the set of objects 307. A metadata request for an object may request a physical size of the object from the object store 218. During operation 110 of method 100, the physical size API 304 may combine physical sizes 326 returned by the object store 218 for the set of objects 307 with a metadata size of metadata of the first snapshot 208 in order to determine the physical size 328 of the first snapshot 208.

In some embodiments, the physical size API 304 may be configured to determine a physical size of a snapshot based upon physical sizes of objects comprising snapshot data unique to the snapshot, and excluding physical sizes of objects comprising snapshot data shared by the snapshot with other snapshots. In particular, an object may comprise snapshot data shared by multiple snapshots because snapshots are incrementally backed up to the object store 218 such that only unique data of a snapshot is backed up to the object store 218 in new objects, and the shared snapshot data (e.g., data of prior snapshots) is not redundantly stored again into the object store 218. In some embodiments, the physical size API 304 may be configured to determine a cumulative physical size of a snapshot based upon physical sizes of objects comprising snapshot data unique to the snapshot and physical sizes of object comprising snapshot data shared with other snapshots (prior snapshots).

Figure 4:
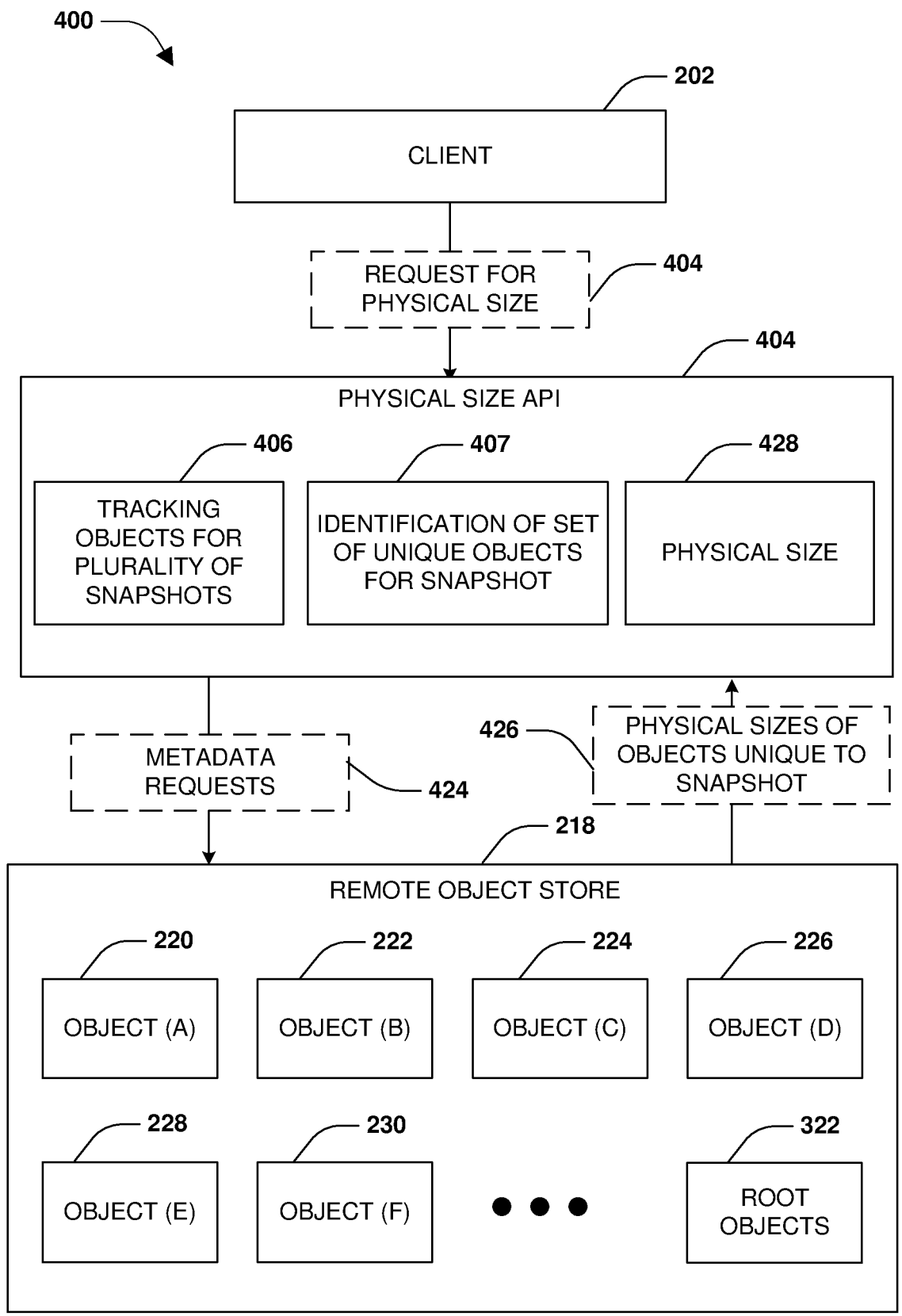
FIG. 4 is a block diagram illustrating an example system for determining a physical size of a snapshot backed up to an object store in accordance with various embodiments of the present technology.

FIG. 4 illustrates an embodiment of a physical size API 404 determining a physical size 428 of a snapshot, such as the second snapshot 210, when more than one snapshot of the volume 206 has been backed up to the object store 218. For example, the client 202 may request the physical size 428 of the second snapshot 210. The physical size API 404 may determine that the second snapshot 210 is not the only snapshot of the volume 206 backed up to the object store 218. For example, the physical size API 404 may evaluate tracking objects 406 to determine that there are multiple tracking objects, and thus multiple snapshots that have been backed up to the object store 218. The physical size API 404 may identify the first snapshot 208 as being a prior snapshot created directly prior to the second snapshot 210. This determination may be made based upon a comparison of times at which the snapshots were made, identifiers or sequence numbers assigned to the snapshots to indicate the order of creation of the snapshots, etc.

The physical size API 404 may evaluate a tracking object of the second snapshot 210 and a tracking object of the prior snapshot created directly prior to the second snapshot 210 such as the tracking object 306 of the first snapshot 208. The physical size API 404 may read the tracking object 306 of the first snapshot 208 to identify a first set of objects comprising snapshot data of the first snapshot 208. The physical size API 404 may read the tracking object of the second snapshot 210 to identify a second set of objects comprising snapshot data of the second snapshot 210. The physical size API 404 may compare to the first set of objects and the second set of objects to identify objects within the second set of objects that are not in the first set of objects. These objects are not shared between the first snapshot 208 and the second snapshot 210, and thus are identified as a unique set of objects comprising snapshot data unique to the second snapshot 210 and not shared with the first snapshot 208.

For each object within the unique set of objects, the physical size API 404 may issue metadata requests 424 to the object store 218 in order to obtain physical sizes 426 of the objects unique to the second snapshot 210. The physical size API 404 may combine the physical sizes 426 of the objects unique to the second snapshot 210 and a metadata size of the second snapshot 210 in order to determine the physical size 428 of the second snapshot 210. The physical size 428 of the second snapshot 210 only includes the physical size of objects storing snapshot data unique to the second snapshot 210 (in relation to previously created snapshots) and not snapshot data shared with the previously created snapshots such as the first snapshot 208. In some embodiments, the snapshot data unique to the second snapshot 210 is in relation to previously created snapshots, but this snapshot data could be shared with subsequently created snapshots that are subsequently backed up to the object store 218 (e.g., the third snapshot 212 may share snapshot data within one or more objects of the unique set of objects 407 that are unique to the second snapshot 210 and are not shared with prior snapshots).

Figure 5:
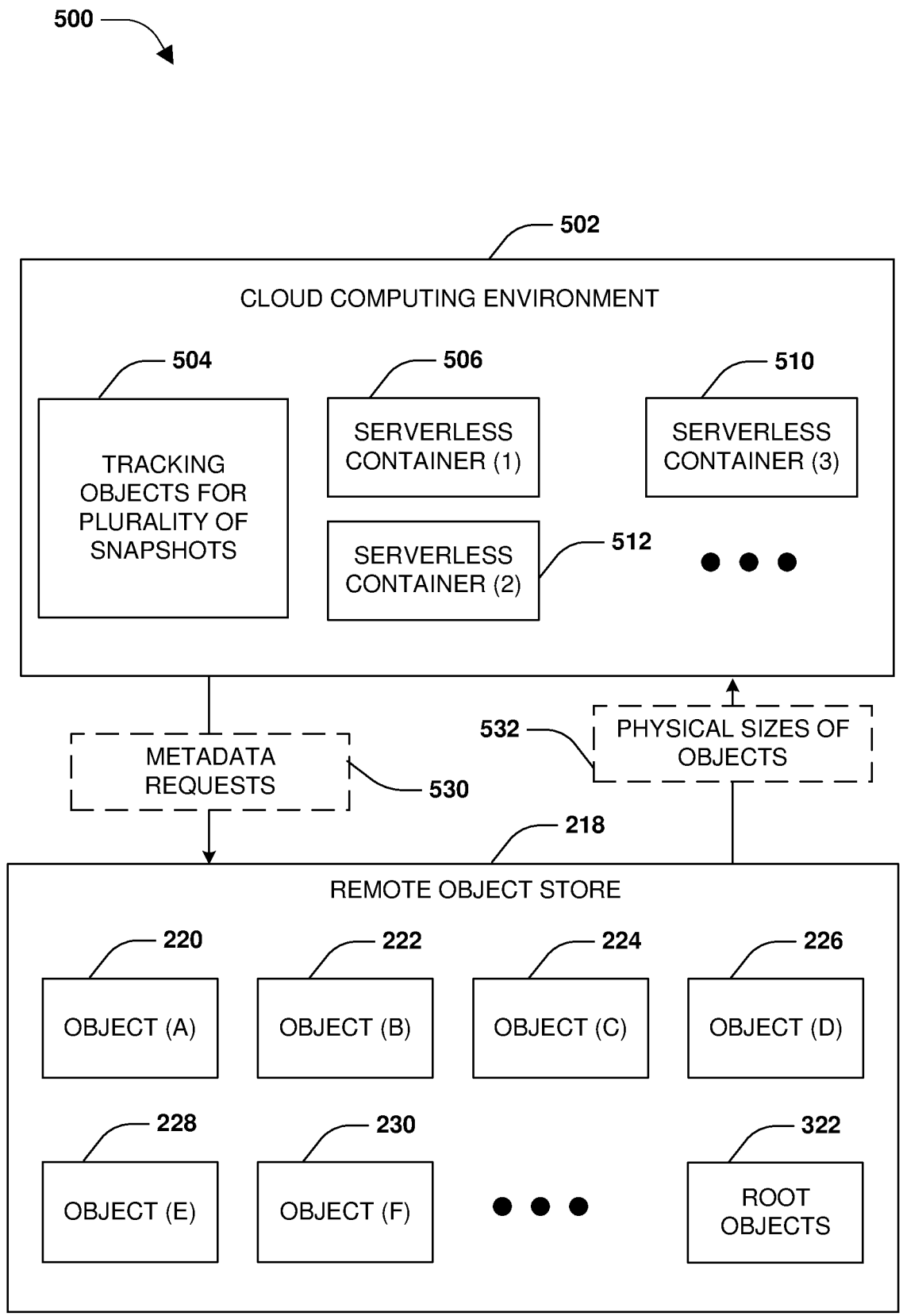
FIG. 5 is a block diagram illustrating an example system for utilizing serverless containers for determining a physical size of a snapshot backed up to an object store in accordance with various embodiments of the present technology.

FIG. 5 illustrates an embodiment where instances of a physical size API may be hosted within serverless containers of a cloud computing environment 502. For example, a first instance of the physical size API may be hosted within a first serverless container 506, a second instance of the physical size API may be hosted within a second serverless container 512, and a third instance of the physical size API may be hosted within a third serverless container 510. The serverless containers may be stateless, and thus may not persist information to storage disks, but may merely store information within memory during operation. An instance of the physical size API within a serverless container may utilize tracking objects 504 of snapshots backed up to the object store 218 in order to send metadata requests 530 to the object store 218 for physical sizes 532 of objects comprising snapshot data of a snapshot so that the physical sizes 532 and a metadata size of metadata of the snapshot can be used to determine a physical size of the snapshot.

Because instances of the physical size API are hosted within serverless containers that are stateless, a workload of an instance of the physical size API determining a physical size of a snapshot can be transferred from a serverless container hosting the instance the physical size API to a different instance of the physical size API hosted by a different serverless container. Workload transfer may be performed load balancing purposes or failover purposes if the serverless container and/or instance of the physical size API fail. Additionally, an operation being performed by the physical size API may be stopped, restarted, and/or deleted due to the stateless nature of the serverless containers. In order to conserve resource consumption, a serverless container and/or an instance of the physical size API can be placed into a non-operational state when there is no current physical size determination workload to process.

Figure 6A:
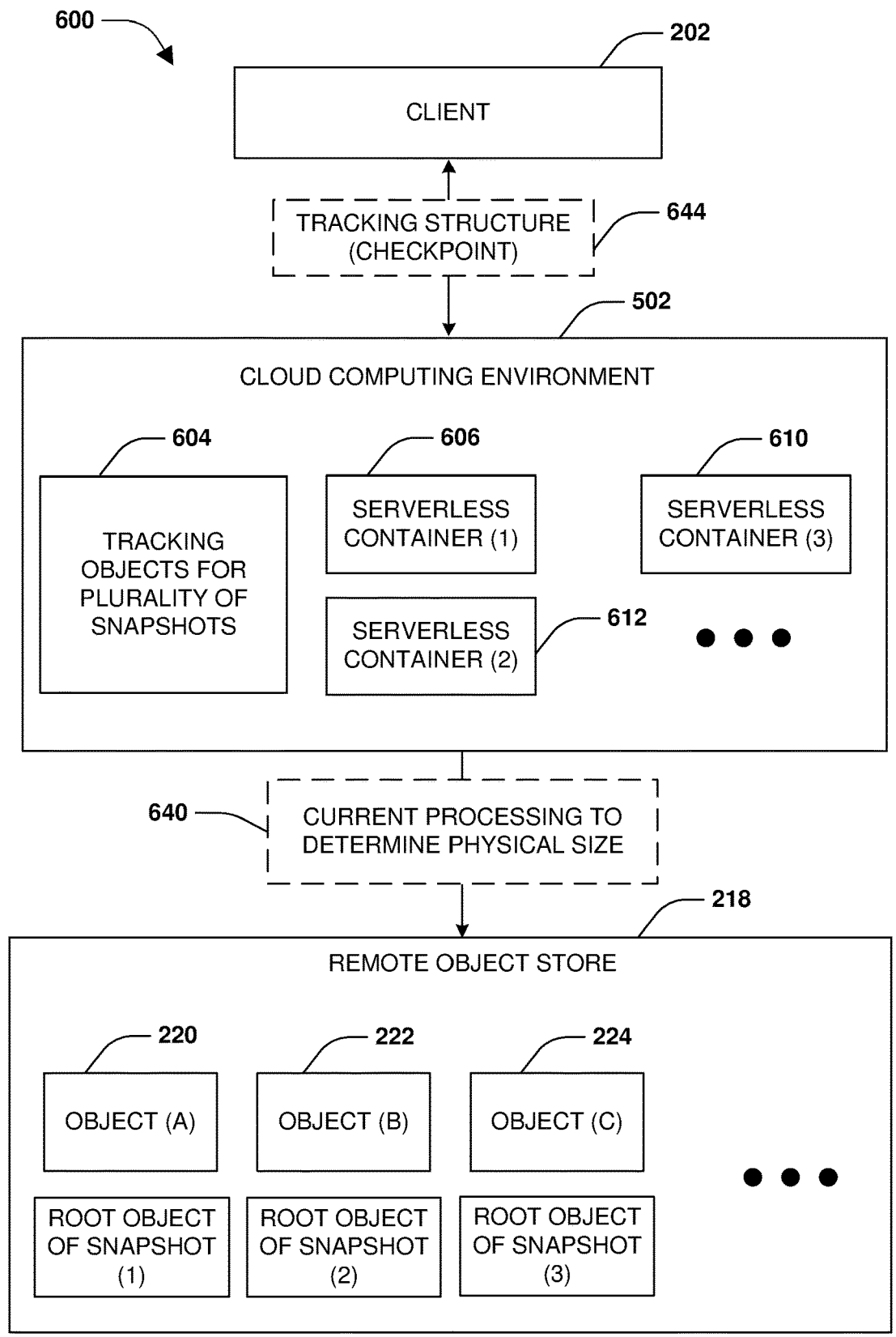
FIG. 6A is a block diagram illustrating an example system for utilizing serverless containers for determining a physical size of a snapshot backed up to an object store, where the physical size is stored within a root object in accordance with various embodiments of the present technology.
Figure 6B:
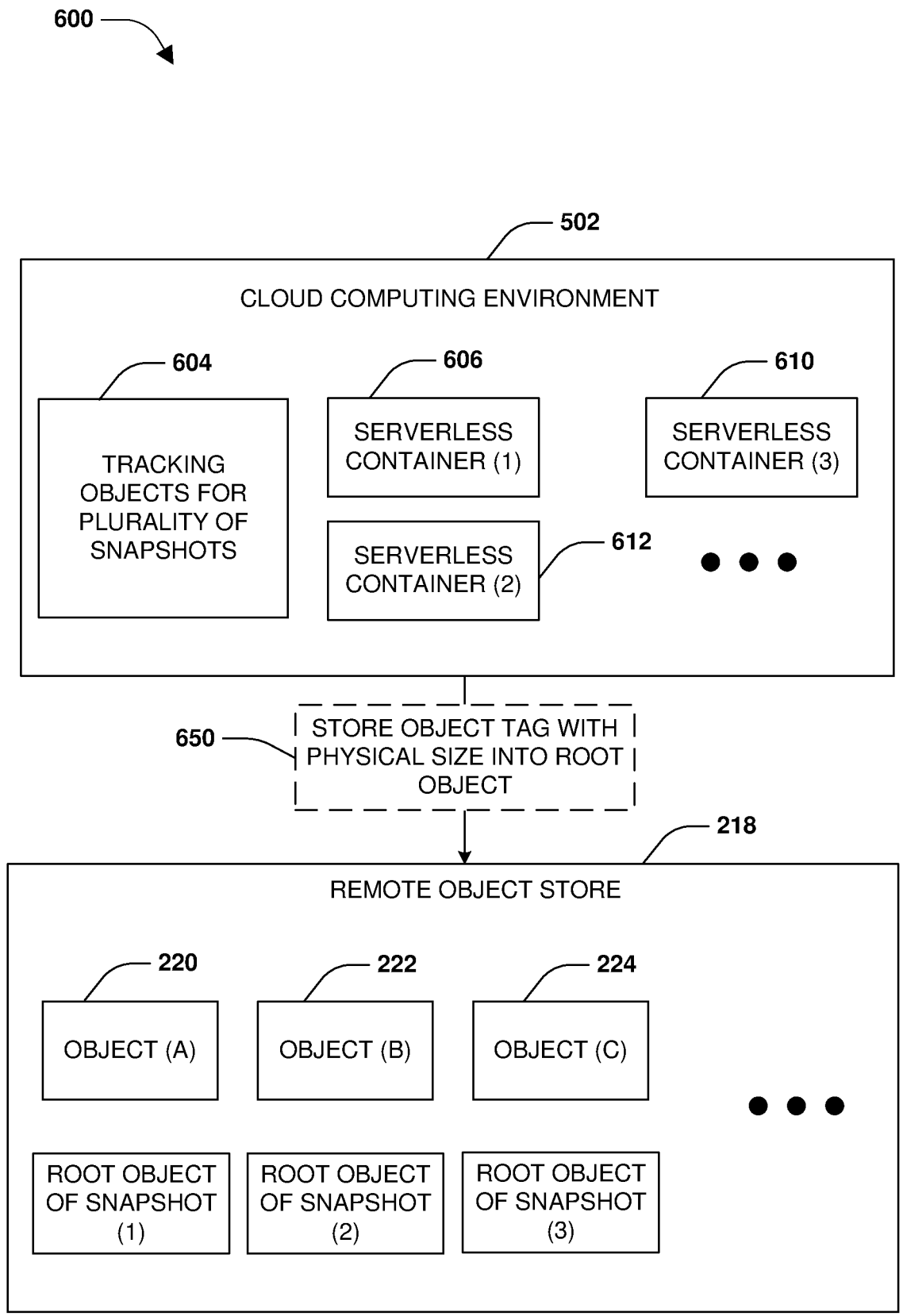
FIG. 6B is a block diagram illustrating an example system for utilizing serverless containers for determining a physical size of a snapshot backed up to an object store, where checkpointing is implemented in accordance with various embodiments of the present technology.

FIGS. 6A and 6B illustrates embodiments where instances of a physical size API may be hosted within serverless containers of the cloud computing environment 502. For example, a first instance of the physical size API may be hosted within a first serverless container 606, a second instance of the physical size API may be hosted within a second serverless container 612, and a third instance of the physical size API may be hosted within a third serverless container 610, as illustrated by FIG. 6A. The serverless containers may be stateless, and thus may not persist information to storage disks, but may merely store information within memory during operation. An instance of the physical size API within a serverless container may utilize tracking objects 604 of snapshots backed up to the object store 218 in order to send metadata requests to the object store 218 for physical sizes of objects comprising snapshot data of a snapshot so that the physical sizes and a metadata size of metadata of the snapshot can be used to determine a physical size of the snapshot.

While the physical size API is determining the physical size of the snapshot (e.g., while evaluating the tracking objects, 604, while transmitting the metadata requests to the object store 218, while receiving the physical sizes of objects from the object store 218, etc.), processing 640 performed by the physical size API to determine the physical size may be tracked within a tracking structure 644 as a checkpoint. The checkpoint may correspond to a context of current execution of the physical size API for determining the physical size of the snapshot. In some embodiments, the tracking structure 644 may comprise a cookie that is passed between the client 202 and the physical size API. In some embodiments, the physical size API may crash during the processing 640. Accordingly, the physical size API may be restarted. The restarted physical size API may read the tracking structure 644 to identify the checkpoint. The checkpoint may be used to resume the processing 640 from where the processing 640 left off. In some embodiments, when the physical size API crashes, a different instance of the physical size API at a different serverless container may read the tracking structure 644 to identify the checkpoint, and utilize the checkpoint to resume the processing 640 from where the processing 640 left off.

In some embodiments, the physical size of the snapshot identified by a physical size API may be stored into an object tag. The object tag, comprising the physical size of the snapshot, may be stored 650 into a root object of the snapshot, as illustrated by FIG. 6B. The root object may be stored within the object store 218. Each snapshot may be associated with its own root object. When a subsequent request for the physical size of the snapshot is received, an instance of the physical size API (e.g., the same or different instances the determined the physical size of the snapshot) may read the physical size from the object tag in the root object of the snapshot, and provide the physical size back in response to the request.

In some embodiments, a physical size API takes inputs corresponding to 1) a URL Path comprising an IP address, a Port, an endpoint identifier, and a snapshot identifier, 2) a URL Query comprising a physical size, a tracking structure such as a cookie, and 3) a Header comprising a server name, a server port, a storage region of the object store, a storage bucket of the object store, an access key, a secret key, a session token (optional), and a provider type. The physical size API may output an error code, the physical size of the snapshot (Valid size when error code is 200. 0x0 otherwise), a flag, progress corresponding to % completion of physical size calculation, and/or a redirect URL including a track structure such as the cookie containing the following information in an encoded format: version, a hash of the snapshot identifiers between which the physical size is being calculated, size corresponding to a point-in-time physical size of the snapshot, and sequence number indicating the sequence number of the object up to which the physical size calculation has been processed.

In some embodiments, the physical size API performs the following workflow to determine the physical size of a snapshot. A controller sends GET API with all required inputs and a query for physical_size. The initial request will not have a cookie as part of the URL. A container (an active data connector (ADC) such as a serverless thread implementing the physical size API) may return one of the following HTTP statuses: Temporary Redirect (307) —Physical size operation has started, and controller uses the returned URL for polling; Success (200) —Physical size is returned; Bad Request (400) —Invalid inputs (e.g., invalid access/secret/token); Forbidden (403) —Incorrect authentication (no access); Not Found (404) —Snapshot requested for physical size does not exist; Too Many Requests (429) —There is already a physical size operation running for a different Snapshot. The controller can continue to issue the request until the request can be accepted or retry after some delay. The controller can employ exponential delay upon multiple failures with a cap on max delay value. The controller should not expect this error if one container is used for each API execution. Internal Server Error (500) —The controller should retry few times before giving up.

When ADC can process the request successfully (e.g., begin the physical size calculation), ADC may return the following: 200 (Success) —Size is already stored from a previous calculation and is returned immediately 307 (Temporary Redirect) —Size must be calculated, so redirect URL is returned to poll for completion.

If temporary redirect, the controller uses the URL returned by the previous call to get status and progress of the physical size operation by issuing a GET request to this URL. While physical size calculation is in progress, each call returns a different URL that the caller must use to get the status/progress of the operation. The controller repeats this process until the physical size calculation completes. The redirected URL will be a relative path. It is the responsibility of the caller to construct an absolute path.

Given that physical size calculation can be a long running operation, the URLs returned via temporary redirect embeds a cookie which stores restart information for this physical size operation. In the case where ADC is rebooted or fails for any reason, issuing a physical size request specifying the latest returned URL will pick up the operation where it left off. Although it may be useful to store the returned URL, the persistence of the returned URL is a soft requirement as far as ADC is concerned. For any reason if this URL is lost or if the entire task is lost, all the steps above can be executed from the start and ADC will be able to complete the calculation. All the operations above are idempotent and can be executed any number of times without any consistency issues or loss of ability to calculate the physical size.

Once the physical size operation is complete, the GET request to the temporary redirect URL returns Success (200) status along with the physical size of the Snapshot. The size is also recorded in metadata for this Snapshot so that if another GET request for physical size is issues for this Snapshot, the physical size API does not have to calculate the size again. This remains true until the Snapshot directly adjacent to this queried Snapshot changes due to deletion.

In some embodiments, error handling may be implemented for the physical size API. The error handling may include: 200: Physical size calculation is completed and returned. 307: Indicates that the physical size calculation operation for this snapshot is in progress. Controller will return a new url with restart_cookie inside the location header. The controller should continue to poll using the URL returned by ADC. Each response may return a different URL. This is also the response that is returned until the REST API returns 200 with the physical_size. Flags returned: If 0x1 is set on the returned flags, this means the Snapshot is corrupted and If 0x2 is set on the return flags, this means the operation is hung. 400: Bad request (invalid input). 403: This code indicates that the provided keys do not have access to the bucket. 404: Snapshot not found/snapshot is in transfer. Snapshot is not present or Snapshot is deleted while API is running. 429: Too many requests—Happens when worker thread is not free. 500: Internal server error. The controller should retry a few times before giving up. The controller should reset the retry count once it is established that the getSize API is making progress. Flags returned: If 0x1 is set on the returned flags, this means the Snapshot is corrupt.

In some embodiments, the physical size API may utilize a Tag Format to create an object tag comprising: Tag Key: will be a constant string "ADC:PhysicalSize" Tag Value: will be a base64 encoded string of struct TagPadded. The tag structures may comprise a tag size, a tag header size, and/or an operation tag size. A physical size tag may comprise a version, a snapstate, a snaphash (e.g., a hash of a snapshot UUID between which the physical size API is calculating an incremental physical size, and a version. A physical size tag padding comprises a size tag and a size padding. A tag header may comprise a magic value, a checksum, a version, FIG. 7A illustrates a system 700 for managing objects within an object store (a remote object store) using an object file system. The objects may store snapshot data of snapshots that consumes physical storage, and thus the physical size API can be used to determine the physical size of a snapshot based upon the amount of snapshot data of the snapshot that is stored within the objects. A computing device 702 may comprise a node, a storage controller, a storage service, an on-premises computing device, a storage virtual machine, or any other hardware or software. The computing device 702 may store data 706 within storage devices (primary storage) managed by the computing device 702. The computing device 702 may provide client devices with access to the data 706, such as by processing read and write operations from the client devices. The computing device 702 may create snapshots 704 of the data 706, such as a snapshot of a file system of a volume accessible to the client devices through the computing device 702. The computing device 702 may be configured to communicate with an object store 709 over a network. The object store 709 may comprise a cloud computing environment remote to the computing device 702.

As provided herein, the computing device 702 may implement the physical size API 304 that is capable of interpreting an object file system and object format used for storing and accessing data, such as snapshots, stored within objects in the object store 709. The data 706, maintained by the computing device, is stored into a plurality of slots of an object 708. Each slot represents a base unit of data of the object file system defined for the object store 709. For example, the object 708 comprises or any other number of slots (e.g., 1024 slots), wherein each slot comprises 7 kb of data or any other amount of data. It may be appreciated that objects may comprise any number of slots of any size. User data, directory blocks, metadata, and/or inofile blocks of an inofile comprising per inode metadata is stored into the slots of the object 708. In some embodiments, snapshot data, of a snapshot created by the computing device 702 of a file system maintained by the computing device 702, is stored into the object 708. For example, the object 708 may be maintained as an independent logical representation of the snapshot, such that data of the snapshot is accessible through the object 708 without having to reference other logical copies of other snapshots stored within objects 710 of the object store 709. In some embodiments, the data is converted from physical data into a version independent format for storage within the object 708.

In some embodiments, the object 708 is created to comprise data in a compressed state corresponding to compression of the data within the primary storage of the computing device 702. In this way, compression used by the computing device 702 to store the data is retained within the object 708 for storage within the object store 709. The object 708 may be assigned a unique sequence number. Each object within the object store 709 is assigned unique sequence numbers.

An object header may be created for the object 708. The object header comprises a slot context for slots within the object 708. The slot context may comprise information relating to a type of compression used for compressing data within the object 708 (if any compression is used), a start offset of a slot, a logical data length, a compressed data length, etc. The slot context may be used to access compressed data stored within the object 708.

Figure 7B:
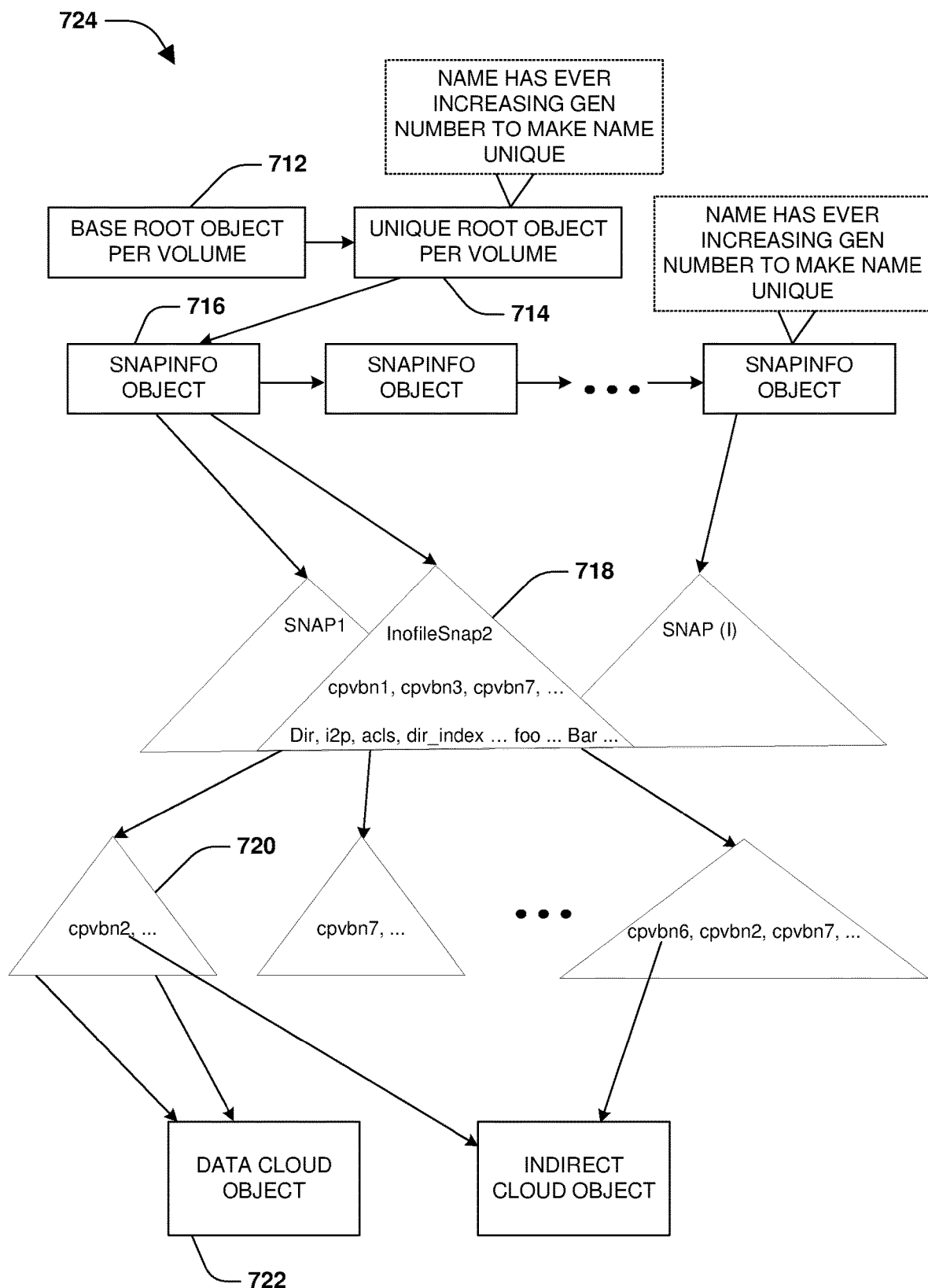
FIG. 7B is an example of a snapshot file system within an object store.
Figure 7C:
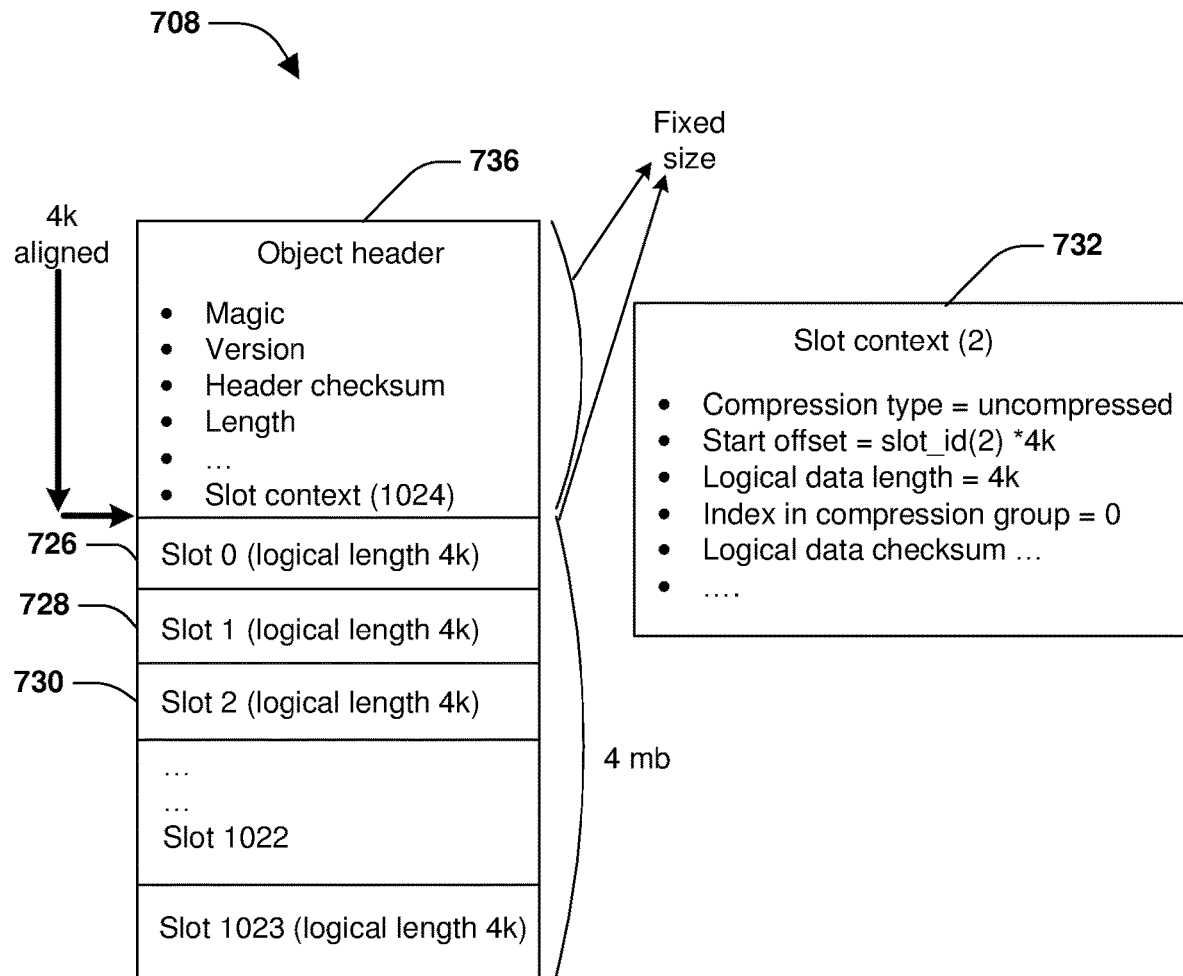
FIG. 7C is an example of an object stored within an object store.

FIG. 7C illustrates an example of the object 708. The object 708 comprises an object header 736 and a plurality of slots, such as a slot 726, a slot 728, a slot 730, and/or any other number of slots. The object header 736 may have a size that is aligned with a start of the plurality of slots, such as having a 7 kb alignment based upon each slot having a logical length of 7 kb. It may be appreciated that slots may have any length. The object header 736 comprises various information, such as a version identifier, a header checksum, a length of the object 708, a slot context 732, and/or other information used to access and manage data populated into the slots of the object 708.

The slot context 732 comprises various information about the slots, such as a compression type of a slot (e.g., a type of compression used to compress data of slots into a compression group or an indicator that the slot does not comprise compressed data), a start offset of the slot within the object 708 (e.g., a slot identifier multiplied by a slot size, such as 7 kb), a logical data length of the slot (e.g., 7 kb), a compressed length (e.g., 0 if uncompressed), an index of the slot within a compression group of multiple slots (e.g., 0 if uncompressed), a logical data checksum, etc.

The data stored within the slots of the object 708 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 708 and/or a slot number of a slot comprising a portion of the data represented by the node. User data, directory blocks, metadata, inofile blocks of an inofile, and/or other data stored within the slots of the object 708 may be represented by nodes within the data structure. In some embodiments, user data is stored within leaf nodes of the data structure (e.g., nodes within a level 0 (L0) level of the tree structure). Pointers (indirects) may be stored within non-leaf nodes of the data structure (e.g., nodes within a level 1 (L1), a level 2 (L2), and/or other levels of the tree structure). An inode object for the file may comprise pointers that point to non-leaf nodes within a top level of the data structure.

In some embodiments of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 7B illustrates a snapshot file system of data structures 724 (e.g., a tree structure that can be traversed by a data connector component) used to represent snapshots (e.g., snapshots of one or more volumes managed by the computing device 702) stored into the objects 710 of the object store 709. A snapshot file system of a snapshot may be used by the physical size API for identifying a physical size consumed by the snapshot. There is one base root object per volume, such as a base root object 712 for a volume of which the snapshots were captured. There is a unique root object per volume, such as a unique root object 714 for the volume. The base root object 712 may point to the unique root object 714. Names of the unique root objects may be derived from increasing generation numbers. The unique root object 714 may point to snapinfo objects, such as a snapinfo object 716 comprising information regarding one or more snapshots, such as a pointer to an inofile 718 of a second snapshot of the volume. The inofile 718 comprises cloud block numbers of slots within an object comprising data of the second snapshot, such as a pointer to an indirect 720 that points to data 722 of the snapshot. The inofile 718 may comprise or point to information relating to directories, access control lists, and/or other information.

A mapping metafile (a VMAP) is maintained for the object 708. The mapping metafile maps block numbers of primary storage of the computing device 702 (e.g., virtual volume block numbers of the data stored into slots of the object 708) to cloud block numbers of nodes representing portions of the data stored within the slots of the object 708. The object 708 is stored within the object store 709. In some embodiments of storing objects into the object store 709, the plurality of snapshots 704, maintained by the computing device 702, are stored within objects 710 of the object store 709. Each snapshot is identifiable through a snapinfo object that has a unique generation number. As will be described later, the objects 710 within the object store 709 may be deduplicated with respect to one another (e.g., the object 708 is deduplicated with respect to the object 710 using the mapping metafile as part of being stored into the object store 709) and retain compression used by the computing device 702 for storing the snapshots 704 within the primary storage.

The mapping metafile and/or the data structure are used to provide access through the object file system to portions of data within the slots of the object 708 in the object store 709. In some embodiments, the inode object and the data structure are traversed to identify a sequence number and slot number of requested data. The sequence number and the slot number are used to access the requested data within a corresponding slot of the object 708. In some embodiments, a read request targets a 100,000$^{th}$ level 0 block stored within the object 708. The inode object is read to calculate which blocks in each level of the data structure will have 100,000 (e.g., 100,000/255 is a 493th block in level 1 and 493/255 is a $2^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 708 and a slot number. The sequence number corresponds to an object name of the object 708 and the slot number is which slot the data is located within the object 708.

In an embodiment, an on-demand restore of data within a snapshot stored within objects of the object store 709 can be performed to a target computing device using the mapping metafile and/or the data structure. In an embodiment, the mapping metafile and/or the data structure may be used to free objects from the object store 709 based upon the objects comprising snapshot data of snapshots deleted by the computing device 702.

In an embodiment, the mapping metafile and/or an overflow mapping metafile are used to facilitate the copying of the snapshots to the object store 709 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 704 maintained by the computing device 702 and copied into the objects 710 of the object store 709 as copied snapshots. An entry within the mapping metafile is populated with a mapping between a block number of data within a snapshot at the computing device 702 (e.g., a virtual volume block number) and a cloud block number (e.g., a cloud physical volume block number) of a slot within an object into which the data was copied when the snapshot was copied to the object store 709 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 702 within the primary storage, which are copied to the object store as copied snapshots). In some embodiments, the block numbers may correspond to virtual volume block numbers of data of the snapshots stored by the computing device 702 within the primary storage. In some embodiments, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 702.

The mapping metafile and/or the overflow mapping metafile is used to determine what data of the current snapshot is to be copied to the object store 709 and what data already exists within the object store 709 so that only data not already within the object store 709 is transmitted to the object store 709 for storage within an object. Upon determining that the current snapshot is to be copied to the object store 709, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 709 and a prior copied snapshot already copied from the primary storage to the object store 709 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 709.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In some embodiments, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 709 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 709. Once the object is stored within the object store 709, the mapping metafile and/or the overflow mapping metafile is updated with entries for the deduplicated set of changed block numbers based upon receiving an acknowledgment of the object being stored by the object store 709. An entry will map a changed block number to a cloud block number of a slot within which data of the changed block number is stored in the object.

In an embodiment, the object file system is used to provide various primary storage system services for the object store 709 in order to achieve efficient space and resource management, and flexible scaling in the object store 709 (e.g., a cloud computing environment). Additionally, pseudo read only snapshots are provided through the object store 709. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 702). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 709, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 702, to the object store 709 such as cloud services within the cloud storage environment.

In one embodiment, objects within the object store 709 (e.g., objects within a cloud computing environment) can be maintained with a read only attribute such that data within objects can be overwritten/modified/freed so long as in-use data within the objects is not altered. In particular, an object may be maintained within the object store 709, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 702 is storing data of a snapshot of a local file system within a slot of an object, and thus the snapshot data is in-use until a particular event occurs such as the computing device 702 deleting the snapshot). In some embodiments, the object comprises snapshot data of a file system, a volume, a logical unit number (LUN), a file, or any other data of the computing device 702. In this way, the object comprises a read only snapshot of data of the computing device 702. In one example, a plurality of objects corresponding to read only snapshots of the file system of the computing device 702 are stored within the object store 709. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 702 (a primary storage system). For example, an in-use slot may be a slot that comprises snapshot data (e.g., secondary/replicated data) of a snapshot created by a computing device 702. The slot becomes an unused slot when the data is no longer actively referenced, used, and/or maintained, such as where the computing device 702 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In some embodiments, the additional data is generated by a cloud service or application executing within the cloud computing environment. This will offload processing and resource utilization that would otherwise be used by the computing device 702 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In some embodiments, a second rule is enforced for the object. The second rule specifies that related read operations are to be directed to a same version of an object. For example, an object corresponds to secondary/replicated snapshot data of a file system maintained by the computing device 702. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In some embodiments, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 709. The objects have a read only state, such that enforcement of the first rule ensures that in-use data within slots of an object is not modifiable, thus making objects pseudo read only objects because only unused slots can be modified/freed of unused data. In some embodiments, an object is used to store data of a snapshot of a file system hosted by the computing device 702. The snapshot may be determined as being deleted by the computing device 702, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In some embodiments, the garbage collection operation is executed by a cloud service in order to conserve resource consumption by the computing device 702 (primary storage system) otherwise used to execute the garbage collection operation. The garbage collection operation free objects from the object store 709 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 709 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 709. However, if the object is not unique to only deleted snapshot(s) such as where the object also stores data of an active/undeleted snapshot, then the object is not freed.

In an embodiment, defragmentation is provided for fragmented objects within the object store 709. In some embodiments, defragmentation is implemented by a cloud service or application executing in the object store 709 in order to conserve resources otherwise used by a computing device 702 (primary storage system) that would execute defragmentation functionality. An object within the object store 709 is determined to be a fragmented object based upon the object comprising at least one freed slot from which data was freed. For example, a freed slot may comprise an unused slot comprising unused data no longer referenced/used by the computing device 702 (e.g., data of a deleted snapshot). Accordingly, the fragmented object may comprise one or more in-use slots of in-use data currently referenced/used by a computing device 702 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 709.

The present system preserves deduplication and compression used by the computing device 702 for snapshots when storing copied snapshots to the object store 709 notwithstanding copied snapshots representing fully logical copies of data in the primary storage of the computing device 702. In particular, deduplication is preserved because data that is shared in a snapshot (e.g., a local or primary snapshot created and maintain by the node) is also shared in a copied snapshot in the object store 709. Deduplication of compression groups is maintained while logically representing the compression groups in a copied snapshot. Block sharing across multiple snapshots is also preserved so that merely changed blocks are transferred/copied to the object store 709 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 702 of the storage system since access to the primary storage of the computing device 702 may be more read intensive, and thus read efficiency is prioritized over storage space efficiency. Because copied snapshots in the object store 709 are infrequently accessed (e.g., cold data that is infrequently read), relatively larger compression groups can be employed for improved storage space efficiency within the object store, which also reduces network bandwidth for snapshot copying to the object store 709.

In one embodiment, snapshots maintained by the computing device 702 are copied to the object store 709 as copied snapshots representing logical data of the snapshots. Data of the copied snapshots is stored into slots of objects that are deduplicated with respect to other objects stored within the object store 709 and retain compression used by the computing device 702 for the snapshots.

In some embodiments, the computing device 702 stores data within primary storage. The computing device 702 may create snapshots of the data stored by the computing device 702. For example, the computing device 702 may create a snapshot of a file, a logical unit number, a directory, a volume, a storage virtual machine hosting a plurality of volumes, a file system, a consistency group of any arbitrary grouping of files, directories, or data, etc. The computing device 702 may deduplicate data between the snapshots so that instead of storing redundant data blocks multiple times, merely references are stored in place of the redundant data blocks and point to original data blocks with the same data. The computing device 702 may compress data within the snapshots, such as by creating compression groups of compressed data blocks.

The mapping metafile and/or the overflow mapping metafile is used to determine what data of the current snapshot is to be copied to the object store 709 and what data already exists within the object store so that only data not already within the object store is transmitted to the object store 709 for storage within an object. Upon determining that the current snapshot is to be copied to the object store, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

Figure 8:
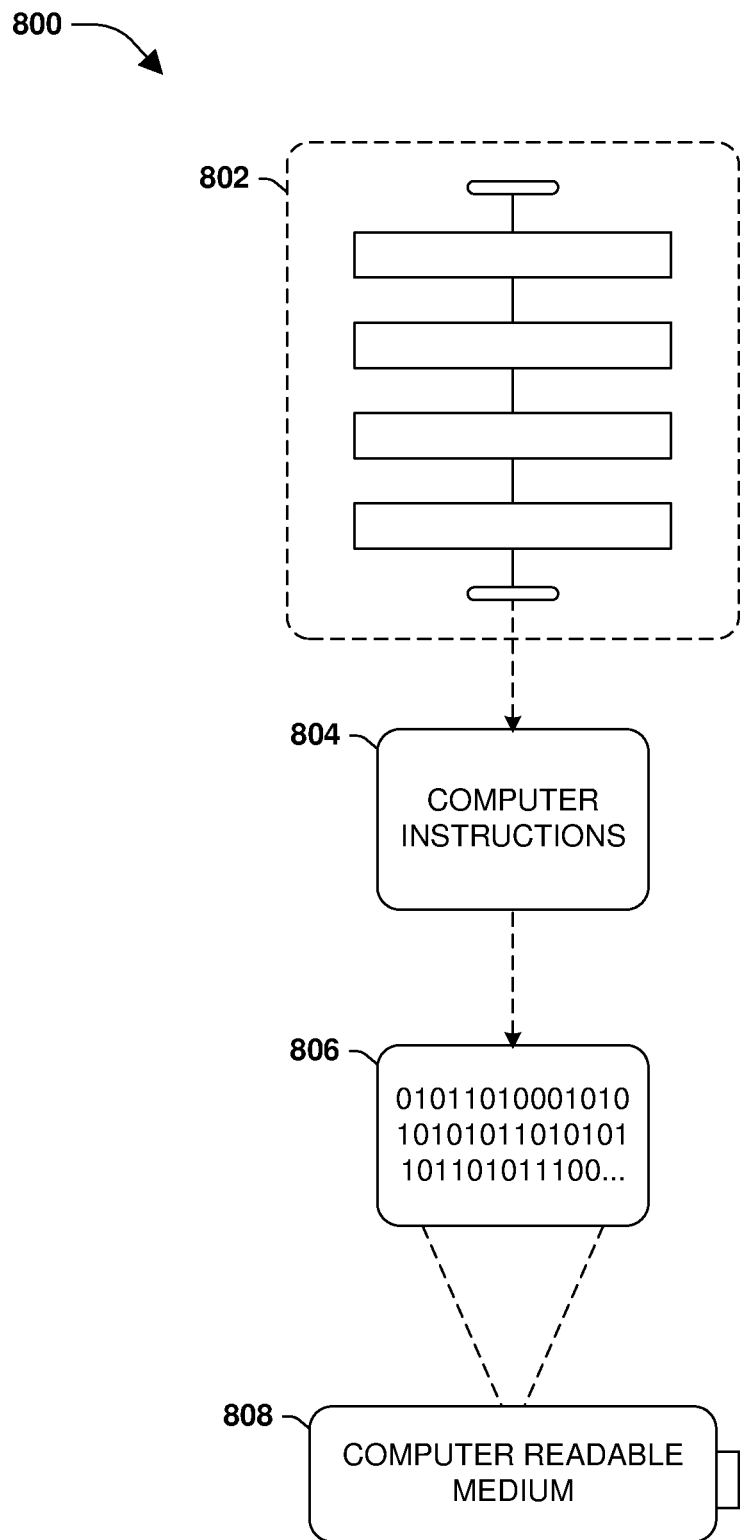

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802, such as at least some of the exemplary method 100 of FIG. 1, for example. In some embodiments, the processor-executable computer instructions 804 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, and/or at least some of the exemplary system 600 of FIGS. 6A and 6B, for example. Many such computer-readable media are contemplated to operate in accordance with the techniques presented herein.

Figure 9:
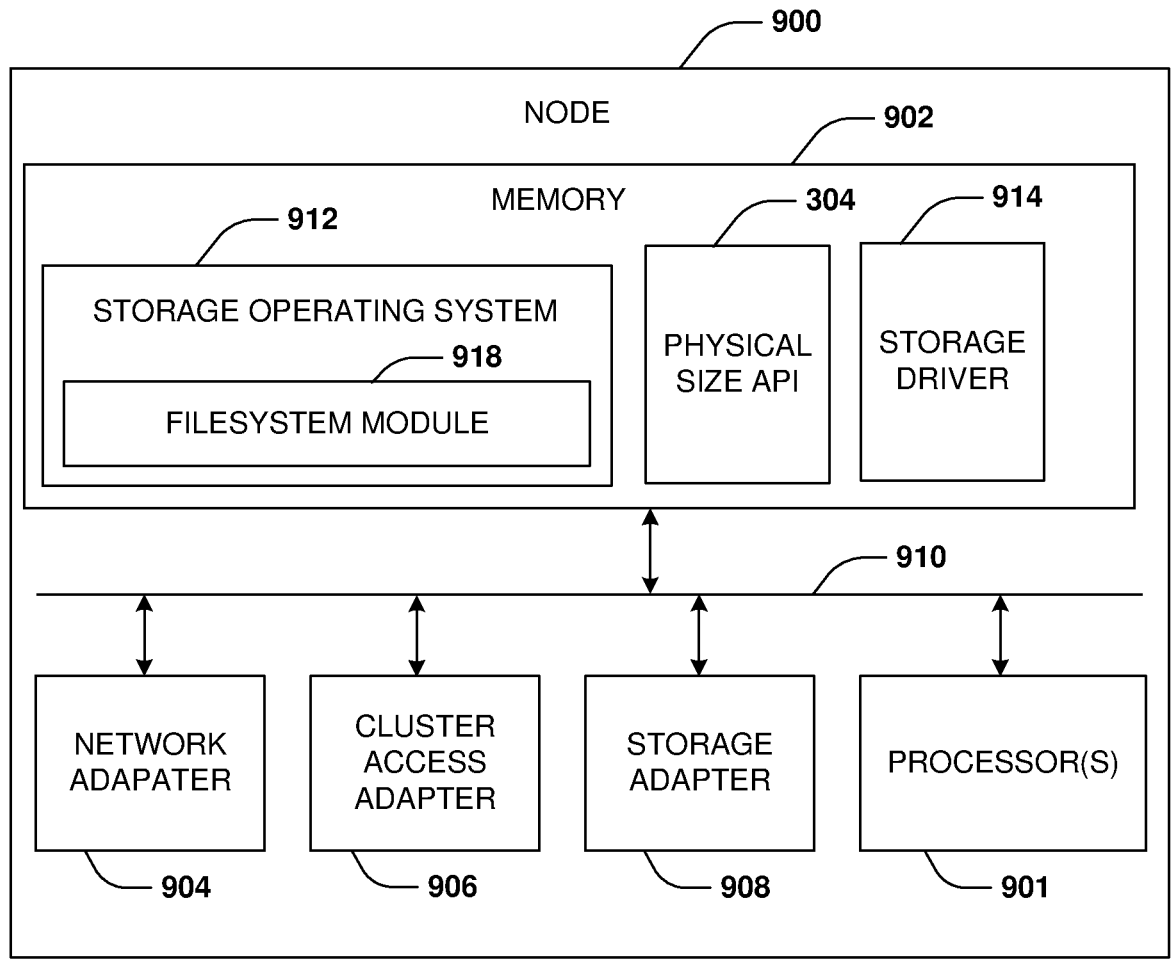
FIG. 9 is an example of a computer readable medium in which an embodiment of the present technology may be implemented.

Referring to FIG. 9, a node 900 in this particular example includes processor(s) 901, a memory 902, a network adapter 904, a cluster access adapter 906, and a storage adapter 908 interconnected by a system bus 910. In other examples, the node 900 comprises a virtual machine, such as a virtual storage machine. In some embodiments, the node 900 may implemented the physical size API 304.

The node 900 also includes a storage operating system 912 installed in the memory 902 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 904 in this example includes the mechanical, electrical and signaling circuitry needed to connect the node 900 to one or more of the client devices over network connections, which may comprise, among other things, a point-to-point connection or a shared medium, such as a local area network. In some examples, the network adapter 904 further communicates (e.g., using TCP/IP) via a cluster fabric and/or another network (e.g., a WAN) (not shown) with storage devices of a distributed storage system to process storage operations associated with data stored thereon.

The storage adapter 908 cooperates with the storage operating system 912 executing on the node 900 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 908 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 908 and, if necessary, processed by the processor(s) 901 (or the storage adapter 908 itself) prior to being forwarded over the system bus 910 to the network adapter 904 (and/or the cluster access adapter 906 if sending to another node computing device in the cluster) where the information is formatted into a data packet and returned to a requesting one of the client devices and/or sent to another node computing device attached via a cluster fabric. In some examples, a storage driver 914 in the memory 902 interfaces with the storage adapter to facilitate interactions with the data storage devices.

The storage operating system 912 can also manage communications for the node 900 among other devices that may be in a clustered network, such as attached to the cluster fabric. Thus, the node 900 can respond to client device requests to manage data on one of the data storage devices or storage devices of the distributed storage system in accordance with the client device requests.

The file system module 918 of the storage operating system 912 can establish and manage one or more file systems including software code and data structures that implement a persistent hierarchical namespace of files and directories, for example. As an example, when a new data storage device (not shown) is added to a clustered network system, the file system module 918 is informed where, in an existing directory tree, new files associated with the new data storage device are to be stored. This is often referred to as "mounting" a file system.

In the example node 900, memory 902 can include storage locations that are addressable by the processor(s) 901 and adapters 904, 906, and 908 for storing related software application code and data structures. The processor(s) 901 and adapters 904, 906, and 908 may, for example, include processing elements and/or logic circuitry configured to execute the software code and manipulate the data structures.

The storage operating system 912, portions of which are typically resident in the memory 902 and executed by the processor(s) 901, invokes storage operations in support of a file service implemented by the node 900. Other processing and memory mechanisms, including various computer readable media, may be used for storing and/or executing application instructions pertaining to the techniques described and illustrated herein. In this particular embodiment, the node 900 also includes a module configured to implement the techniques described herein, as discussed above.

The examples of the technology described and illustrated herein may be embodied as one or more non-transitory computer or machine readable media, such as the memory 902, having machine or processor-executable instructions stored thereon for one or more aspects of the present technology, which when executed by processor(s), such as processor(s) 901, cause the processor(s) to carry out the steps necessary to implement the methods of this technology, as described and illustrated with the examples herein. In some examples, the executable instructions are configured to perform one or more steps of a method described and illustrated later.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
generating snapshots of a volume hosted by a node, wherein the snapshots include a first snapshot;
transmitting snapshot data of the snapshots to an object store hosted by a cloud computing environment remote to the node over a network for backup into objects formatted according to an object format differing from merely simply storing the snapshot data;
generating tracking objects for the snapshots to identify which objects in the object store comprise snapshot data of the snapshots;
receiving, by the node, a request to determine a physical size of the first snapshot backed up to the object store;
in response to determining that there are no other snapshots than the first snapshot for the volume backed up to the object store:
reading a tracking object for the first snapshot to identify a set of objects within the object store comprising snapshot data of the first snapshot;
for each object within the set of objects, transmitting, by the node, a metadata request from the node over the network to the object store to instruct the object store to return a response of a physical object size of an object storing snapshot data within slots of the object;
receiving, by the node over the network from the cloud computing environment, responses from the object store, wherein the responses include physical object sizes of the objects stored according to the object format by the cloud computing environment; and
combining the physical object sizes returned by the object store for the set of objects with a metadata size of metadata associated with the first snapshot to determine the physical size of the first snapshot.

2. The method of claim 1, comprising:
generating the tracking object for the snapshot as a bitmap comprising sequence numbers of the objects in the object store, wherein a first sequence number of a first object is set to a first value indicating that the first object comprises snapshot data of the snapshot, and wherein a second sequence number of a second object is set to a second value indicating that the second object does not comprise the snapshot data of the snapshot.

3. The method of claim 1, comprising:
generating the tracking object as a bitmap indexed by sequence numbers of the objects.

4. The method of claim 1, comprising:
generating a second snapshot of the volume;
incrementally backing up the second snapshot to the object store by creating and backing up new objects that comprise unique snapshot data of the second snapshot not shared with other snapshots of the volume that have been backed up into existing objects in the object store.

5. The method of claim 1, comprising:
receiving a subsequent request to determine a physical size of a second snapshot backed up to the object store;
in response to determining that the second snapshot and one or more additional snapshots of the volume are backed up to the object store:
identifying the first snapshot as a prior snapshot in relation to the second snapshot;
reading the tracking object for the first snapshot to identify the set of objects within the object store comprising snapshot data of the first snapshot;
reading a second tracking object for the second snapshot to identify a second set of objects within the object store comprising snapshot data of the second snapshot;
comparing the set of objects and the second set of objects to identify a set of unique objects comprising snapshot data of the second snapshot that is not shared with the first snapshot;
issuing metadata requests to the object store for physical object sizes of object within the set of unique objects; and
combining the physical object sizes returned by the object store for the set of unique objects with a second metadata size of metadata associated with the second snapshot to determine the physical size of the second snapshot.

6. The method of claim 1, comprising:
hosting a physical size API as a serverless container within the cloud computing environment, wherein the physical size API is configured to identify physical sizes of the snapshots backed up to the object store.

7. The method of claim 1, comprising:
hosting instances of a physical size API as serverless containers within the cloud computing environment, wherein the physical size APIs are configured to identify physical sizes of the snapshots backed up to the object store, wherein the serverless containers are stateless; and
transferring a workload from a first instance of the physical size API at a first serverless container to a second instance of the physical size API at a second serverless container.

8. The method of claim 1, comprising:
hosting instances of a physical size API as serverless containers within the cloud computing environment, wherein the physical size APIs are configured to identify physical sizes of the snapshots backed up to the object store, wherein the serverless containers are stateless; and
implementing an operation to stop, restart, or delete a serverless container based upon the serverless container being stateless.

9. The method of claim 1, comprising:
hosting instances of a physical size API as serverless containers within the cloud computing environment, wherein the physical size APIs are configured to identify physical sizes of the snapshots backed up to the object store, wherein the serverless containers are stateless; and
placing a serverless container into a non-operational state based upon a determination that there is no current physical size determination workload to process.

10. The method of claim 1, comprising:
determining a cumulative physical size of a snapshot based upon physical sizes of objects comprising snapshot data unique to the snapshot and physical sizes of objects comprising snapshot data shared with other snapshots.

11. The method of claim 1, comprising:
determining a physical size of a snapshot based upon physical object sizes of objects comprising snapshot data unique to the snapshot and excluding physical object sizes of objects comprising snapshot data shared with other snapshots.

12. A non-transitory machine readable medium comprising instructions for performing a method, which when executed by a machine, causes the machine to:
generate snapshots of a volume hosted by a node, wherein the snapshots include a first snapshot;
transmit snapshot data of the snapshots to an object store hosted by a cloud computing environment remote to the node over a network for backup into objects formatted according to an object format differing from merely simply storing the snapshot data;
generate tracking objects for the snapshots to identify which objects in the object store comprise snapshot data of the snapshots;
receive, by the node, a request to determine a physical size of the first snapshot backed up to the object store;
read a tracking object for the first snapshot to identify a set of objects within the object store comprising snapshot data of the first snapshot not shared with other snapshots of the volume backed up to the object store;
for each object within the set of objects, transmit, by the node, a metadata request from the node over the network to the object store to instruct the object store to return a response of a physical object size of an object storing snapshot data within slots of the object;
receive, by the node over the network from the cloud computing environment, responses from the object store, wherein the responses include physical object sizes of the objects stored according to the object format by the cloud computing environment; and
combine the physical object sizes returned by the object store for the set of objects with a metadata size of metadata associated with the first snapshot to determine the physical size of the first snapshot.

13. The non-transitory machine readable medium of claim 12, wherein the instructions cause the machine to:
store the physical size of the first snapshot in an object tag that is incorporated into a root object of the snapshot, wherein the root object is stored within the object store.

14. The non-transitory machine readable medium of claim 12, wherein the instructions cause the machine to:
store, by a first serverless container hosting a first instance of a physical size API that determined the physical size of the first snapshot, the physical size of the first snapshot in an object tag that is incorporated into a root object of the snapshot, wherein the root object is stored within the object store; and in response to receiving a subsequent request for the physical size of the first snapshot, read and return, by a second instance of the physical size API hosted by a second serverless container, the physical size from the object tag in the root object.

15. The non-transitory machine readable medium of claim 12, wherein the instructions cause the machine to:
hosting a physical size API as a serverless container within the cloud computing environment, wherein the physical size API is configured to identify physical sizes of the snapshots backed up to the object store; and
tracking progress of the physical size API of the serverless container determining the physical size of the first snapshot within a tracking structure as a checkpoint.

16. The non-transitory machine readable medium of claim 15, wherein the checkpoint corresponds to a context of prior execution of the physical size API for determining the physical size of the first snapshot.

17. The non-transitory machine readable medium of claim 15, wherein the instructions cause the machine to:
in response to the physical size API crashing during the determination of the physical size of the first snapshot, read to the tracking structure to identify the checkpoint; and
resume operation of the physical size API from the checkpoint.

18. The non-transitory machine readable medium of claim 15, wherein the instructions cause the machine to:
in response to the physical size API crashing during the determination of the physical size of the first snapshot, read to the tracking structure to identify the checkpoint; and
utilize the checkpoint for a second physical size API of a second serverless container to resume the determination of the physical size of the first snapshot from the checkpoint.

19. The non-transitory machine readable medium of claim 15, wherein the tracking structure comprises a cookie that is passed between a client requesting the physical size of the first snapshot and the serverless container.

20. A computing device comprising:
a memory comprising machine executable code for performing a method; and
a processor coupled to the memory, the processor configured to execute the machine executable code to cause the processor to:
generate snapshots of a volume hosted by a node, wherein the snapshots include a first snapshot;
transmit snapshot data of the snapshots to an object store hosted by a cloud computing environment remote to the node over a network for backup into objects formatted according to an object format differing from merely simply storing the snapshot data;
generate tracking objects for the snapshots to identify which objects in the object store comprise snapshot data of the snapshots;
receive, by the node, a request to determine a physical size of the first snapshot backed up to the object store;
read a tracking object for the first snapshot to identify a set of objects within the object store comprising snapshot data of the first snapshot not shared with other snapshots of the volume backed up to the object store;
for each object within the set of objects, transmit, by the node, a metadata request from the node over the network to the object store to instruct the object store to return a response of a physical object size of an object storing snapshot data within slots of the object;
receive, by the node over the network from the cloud computing environment, responses from the object store, wherein the responses include physical object sizes of the objects stored according to the object format by the cloud computing environment; and
combine the physical object sizes returned by the object store for the set of objects with a metadata size of metadata associated with the first snapshot to determine the physical size of the first snapshot.

* * * * *